March 28, 1944.　　　R. F. ONSRUD　　　2,345,495
CHUCK
Filed Feb. 1, 1943
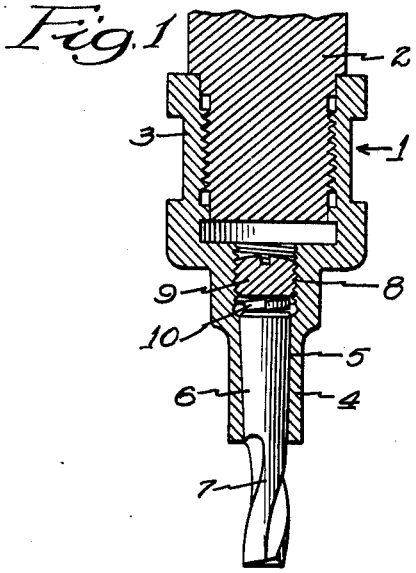
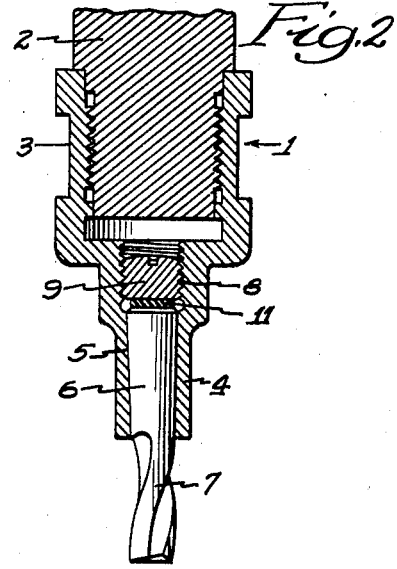
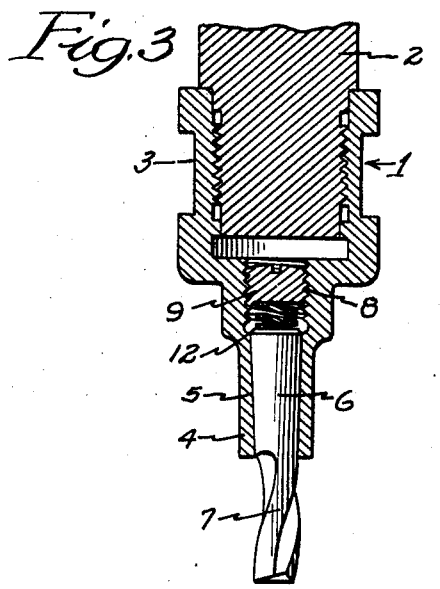
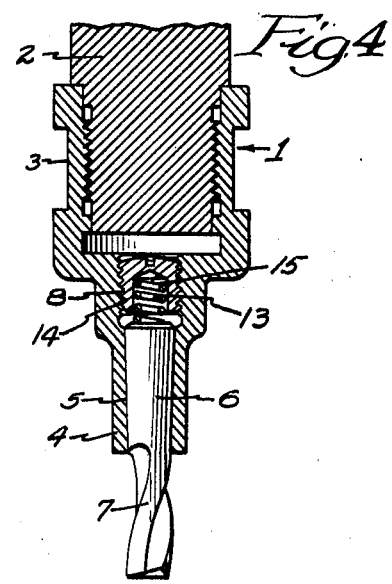

Patented Mar. 28, 1944

2,345,495

UNITED STATES PATENT OFFICE 2,345,495

CHUCK

Rudolph F. Onsrud, Chicago, Ill., assignor to Onsrud Machine Works, Inc., Chicago, Ill., a corporation of Illinois Application February 1, 1943, Serial No. 474,357

4 Claims. (Cl. 279—103)

This invention relates to improvements in chucks designed for attaining uniform contact and pressure between the chuck and the entire shank area of the tool received by the chuck, and is an improvement on the construction shown in my Patent No. 2,280,299, granted April 21, 1942, for Chuck.

The main objects of my invention are to provide a chuck which will keep a tool such as a router or drill truly centralized under severe working stresses and substantially free from vibration; to provide in a chuck of this character having a tapered tool receiving socket, resilient means for seating tapered shanks of bits in said tool socket with a definite axial pressure and allowing for elongation of the bit under normal rise in temperature thereof due to the working load thereon; to provide a chuck of this character which is simple in construction, with a minimum number of parts, has no parts to get out of working order and relatively inexpensive to manufacture.

Specific embodiments of my invention are shown in the accompanying drawing in which:

Figure 1 is a vertical cross-sectional view through my improved chuck showing a split washer positioned between the set screw and the top of the tool.

Fig. 2 is a vertical cross-sectional view similar to that of Fig. 1 but wherein I show the use of a hard-rubber pad instead of a split washer.

Fig. 3 is a vertical cross-sectional view similar to Figures 1 and 2 but wherein I illustrate the use of a helical compression spring in place of the split washer of Fig. 1 and the pad of Fig. 2.

Fig. 4 is a view similar to that of Fig. 3 but wherein I show an axial bore in the set screw and seat a helical compression spring therein.

In the drawing, my new and improved chuck I is arranged for threaded engagement with the lower end of a spindle 2. I have illustrated the lower end of a spindle 2 only in the drawing as it is believed that this is all that is necessary for the present purposes, as the invention herein disclosed resides in the chuck per se.

The chuck I is provided with a hexagonal portion 3 for receiving a wrench to snugly secure the chuck to the spindle. The chuck I has an integral solid sleeve extension 4 which is tapered as at 5 for receiving a conformingly tapered bit shank 6. The smaller end of the tapered socket 5 terminates near the cutting portion 7 of the tool.

The chuck is also provided with a threaded bore 8 which communicates with the tapered socket 5 and is in axial alinement therewith. A headless set screw 9 is inserted in the bore 8 for threaded engagement therewith. Interposed between the set screw 9 and the shank 6 of the bit I insert a resilient spring member, which in Fig. 1 is a split washer 10; in Fig. 2 is a hard-rubber pad 11; in Figs. 3 and 4 is a helical compression spring 12 and 13 respectively. The apparatus and parts shown in Figs. 1, 2 and 3 are identical in every respect except for the resilient spring members; hence like numerals are used in all these figures to refer to the same parts.

The details shown in Fig. 4 are the same as those in the other figures except that the headless set screw 14 is bored axially from the bottom thereof to form a seat and housing 15 for the helical compression spring 13.

Each of the resilient spring members is arranged to bear against the inner end of the tool to force the tool to its seat. The spring strength is calculated to be sufficient to lock the tool and chuck with a gripping force greater than a turning moment sufficient to break the tool, yet this arrangement allows for elongation of the tool upon a rise in temperature.

To remove or insert a tool in the socket of the chuck, it is necessary to remove the chuck from the spindle as the tool enters the chuck from the spindle-receiving portion of the chuck.

It will be apparent from the foregoing that this chuck-tool arrangement is an improvement on the construction of my aforesaid Patent No. 2,280,299 in that I do not have to bore out the end of the spindle and I now eliminate the long compression spring, the plunger and the lock nut of my patent, thereby decreasing the number of parts and yet obtain the same results.

It is to be understood that some of the details set forth may be altered or omitted without departing from the spirit of my invention as defined by the following claims.

I claim:

1. A chuck having an outer end wherein is formed a tapered tool receiving socket, said chuck having walls converging toward the free end thereof to provide said tapered socket, an axial bore in said chuck adjacent the larger end of the tapered socket and in alignment therewith, a tool for said chuck having a tapered shank and arranged to seat against the tapered walls of said socket, a plug adjustable axially in said bore, and spring means in said bore located between and expanding against said plug and the upper end of said tool for securely and resiliently forcing said tool into said tool socket.

2. The device as set forth in claim 1 wherein the spring means comprises a resilient hard-rubber washer.

3. The device as set forth in claim 1 wherein the spring means comprises a split metallic lock washer.

4. The device as set forth in claim 1 wherein the spring means comprises a coil spring.

RUDOLPH F. ONSRUD.